United States Patent

Kojo et al.

[11] Patent Number: 6,041,887
[45] Date of Patent: Mar. 28, 2000

[54] ELECTRIC POWER STEERING APPARATUS

[75] Inventors: Takahiro Kojo; Junji Kawamuro, both of Susono, Japan

[73] Assignee: Toyota Jidosha Kabushiki Kaisha, Toyota, Japan

[21] Appl. No.: 08/998,620

[22] Filed: Dec. 29, 1997

[51] Int. Cl.[7] .................................................. B62D 5/04
[52] U.S. Cl. ............................................................ 180/446
[58] Field of Search .................................. 180/443, 444, 180/446; 701/41, 42

[56] References Cited

U.S. PATENT DOCUMENTS

| | | | |
|---|---|---|---|
| 4,570,734 | 2/1986 | Taig | 180/444 |
| 4,658,927 | 4/1987 | Kanazawa | 180/422 |
| 4,932,492 | 6/1990 | Sauvageot et al. | 180/446 |
| 5,174,407 | 12/1992 | Shimizu et al. | 180/444 |
| 5,267,625 | 12/1993 | Shimizu | 180/443 |
| 5,284,219 | 2/1994 | Shimizu et al. | 180/446 |
| 5,333,700 | 8/1994 | Mouri | 180/444 |
| 5,423,391 | 6/1995 | Shimizu | 180/446 |
| 5,482,130 | 1/1996 | Shimizu | 180/446 |

FOREIGN PATENT DOCUMENTS

| | | |
|---|---|---|
| 62-018366 | 1/1987 | Japan . |
| 62-13764 | 1/1987 | Japan . |
| 62-120272 | 6/1987 | Japan . |
| 63-78877 | 4/1988 | Japan . |

*Primary Examiner*—Kevin Hurley
*Attorney, Agent, or Firm*—Oliff & Berridge, PLC

[57] ABSTRACT

An object of this invention is to provide an electric power steering apparatus with good steering feeling. This electric power steering apparatus has a steering system for turning tires in accordance with manipulation of steering wheel, a power assist motor for assisting this turning of the tires by the steering system, a non-stage transmission with variable transmission ratios, interposed between the power assist motor and the steering system, and an ECU for controlling the transmission ratios of the non-stage transmission and for controlling the output of motor in accordance with the turning of the tires by the steering system.

17 Claims, 9 Drawing Sheets

ELECTRIC POWER STEERING APPARATUS

BACKGROUND OF THE INVENTION

1. Field of the Invention

The present invention relates to an electric power steering apparatus for reducing a steering effort on the steering wheel by torque of a motor.

2. Related Background Art

There existed the conventional electric power steering apparatus among power steering devices for reducing the steering effort on the steering wheel. The electric power steering apparatus was arranged to detect steering torque by a torque sensor and to transmit assist force generated by the motor, based on the steering torque thus detected, through an electromagnetic clutch and a reducing unit to a steering shaft, for example, as disclosed in Japanese Laid-open Utility Model Application No. 62-13764.

In the electric power steering apparatus described above, however, the motor was connected through the reducing unit to the steering shaft, and thus the motor was an inertial object in the steering system. Specifically, the inertia force of the motor, which is sensed by the driver manipulating the steering wheel, is expressed by (moment of inertia of the motor)×(gear ratio)×(gear ratio) and is thus greatly affected by the gear ratios. It was, therefore, the cause of degrading the steering feeling.

SUMMARY OF THE INVENTION

An object of this invention is to provide an electric power steering apparatus with good steering feeling.

In a first aspect of the present invention, an electric power steering apparatus comprises: a steering system for turning a tire in accordance with manipulation of a steering wheel; a motor for supplying a force for assisting the turning by the steering system; a transmission with variable transmission ratios interposed between the motor and the steering system; and control means for controlling the transmission ratios of the transmission and for controlling an output of the motor in accordance with the turning of the tire by the steering system.

With this electric power steering apparatus, the output of the motor is transmitted to the steering system when the steering wheel is manipulated. This output of the motor assists the steering effort on the steering wheel. In this case the output of motor is transmitted through the transmission to the steering system; therefore, by controlling the transmission ratios by the control means, the inertia force of the motor, which could affect the manipulation of the steering wheel, can be controlled.

An electric power steering apparatus according to a second aspect of the present invention is the electric power steering apparatus of the first aspect wherein the control means changes the transmission ratios of the transmission in accordance with a steering condition by the steering system.

With this electric power steering apparatus, the control means changes the transmission ratios of the transmission according to the steering condition in the steering system, such as steering torque, steering angle, steering velocity, or steering angular velocity. Accordingly, the inertial feeling due to the motor can be restricted upon the steering operation on the steering wheel, whereby the steering feeling is improved.

An electric power steering apparatus according to a third aspect of the present invention is the electric power steering apparatus of the first aspect wherein the control means corrects output torque of the motor in accordance with a change amount of transmission ratio of the transmission.

With this electric power steering apparatus, the output torque of the motor is changed by the change amount of transmission ratio of the transmission. Accordingly, the inertial feeling due to the motor can be reduced while maintaining the steering assist performance.

An electric power steering apparatus according to a fourth aspect of the present invention is the electric power steering apparatus of the first aspect further comprising lock state detecting means for detecting a lock state of the motor, wherein the control means changes a transmission ratio of the transmission to zero when the lock state of the motor is detected by the lock state detecting means.

With this electric power steering apparatus, when the motor is locked, the transmission ratio of the transmission is changed to zero; that is, rotation of the steering wheel is kept from being transmitted to the transmission, whereby the effect of the motor lock can be minimized on the manipulation of steering wheel.

An electric power steering apparatus according to a fifth aspect of the present invention is the electric power steering apparatus of the first aspect wherein the control means changes a transmission ratio of the transmission to the infinity upon an inspection of operation of the motor.

With this electric power steering apparatus, the transmission ratio of the transmission is changed to the infinity upon the inspection of operation of the motor; that is, rotation of the input shaft of the transmission is kept from being transmitted to the output shaft of the transmission, whereby the inspection of operation of the motor can be carried out without affecting the steering system.

An electric power steering apparatus according to a sixth aspect of the present invention is the electric power steering apparatus of the first aspect wherein when a steering direction is different from a direction of steering torque, the control means makes a transmission ratio of the transmission smaller than that when the steering direction is coincident with the direction of steering torque.

With this electric power steering apparatus, the transmission ratio of the transmission is decreased, for example, upon switching of steering direction where the steering direction is different from the direction of steering torque, whereby the inertia force due to the motor can be decreased upon switching of steering direction or the like.

An electric power steering apparatus according to a seventh aspect of the present invention is the electric power steering apparatus of the first aspect wherein when a steering direction is inverted; the control means makes a transmission ratio of the transmission smaller than that before the steering direction is inverted.

With this electric power steering apparatus, the transmission ratio of the transmission is decreased, for example, upon switching of steering direction where the steering direction is inverted, whereby the inertia force due to the motor can be decreased upon switching of steering direction or the like.

An electric power steering apparatus according to an eighth aspect of the present invention is the electric power steering apparatus of the first aspect wherein when the steering system turns the tire, the control means makes a transmission ratio of the transmission smaller in the vicinity of a maximum steering angle of the tire than those in a range except for the vicinity of the maximum steering angle of the tire.

With this electric power steering apparatus, the inertia force of the motor can be decreased upon occurrence of hit at the rack end, whereby the load can be reduced on the steering system.

An electric power steering apparatus according to a ninth aspect of the present invention is the electric power steering apparatus of the first aspect wherein the control means changes the transmission ratios of the transmission in accordance with a vehicle condition.

With this electric power steering apparatus, the inertia force adapted to the vehicle condition such as the vehicle weight or a body slip angle can be exerted on the steering wheel during operation of a vehicle behavior control unit, whereby manipulability of the steering wheel can be enhanced.

An electric power steering apparatus according to a tenth aspect of the present invention is the electric power steering apparatus according to either one of the first, the fourth, and the fifth aspects, wherein the transmission comprises: discs provided on the side of the motor and on the side of the steering system, respectively; a friction wheel frictionally contacting the both discs; and a ring body an inside peripheral surface of which frictionally contacts an outside peripheral surface of the frictional wheel, wherein a transmission ratio is changed by changing a position of the contact between the outside peripheral surface of the frictional wheel and the inside peripheral surface of the ring body.

With this electric power steering apparatus, the transmission ratios can be changed in the range of zero to the infinity by changing rotational displacement amounts in the discs provided each on the motor side and on the steering system side and the frictional wheel frictionally contacting the both discs.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

At the beginning the electric power steering apparatus according to the first embodiment of the present invention will be described referring to FIG. 1 to FIGS. 3A–3C.

Figure 1:
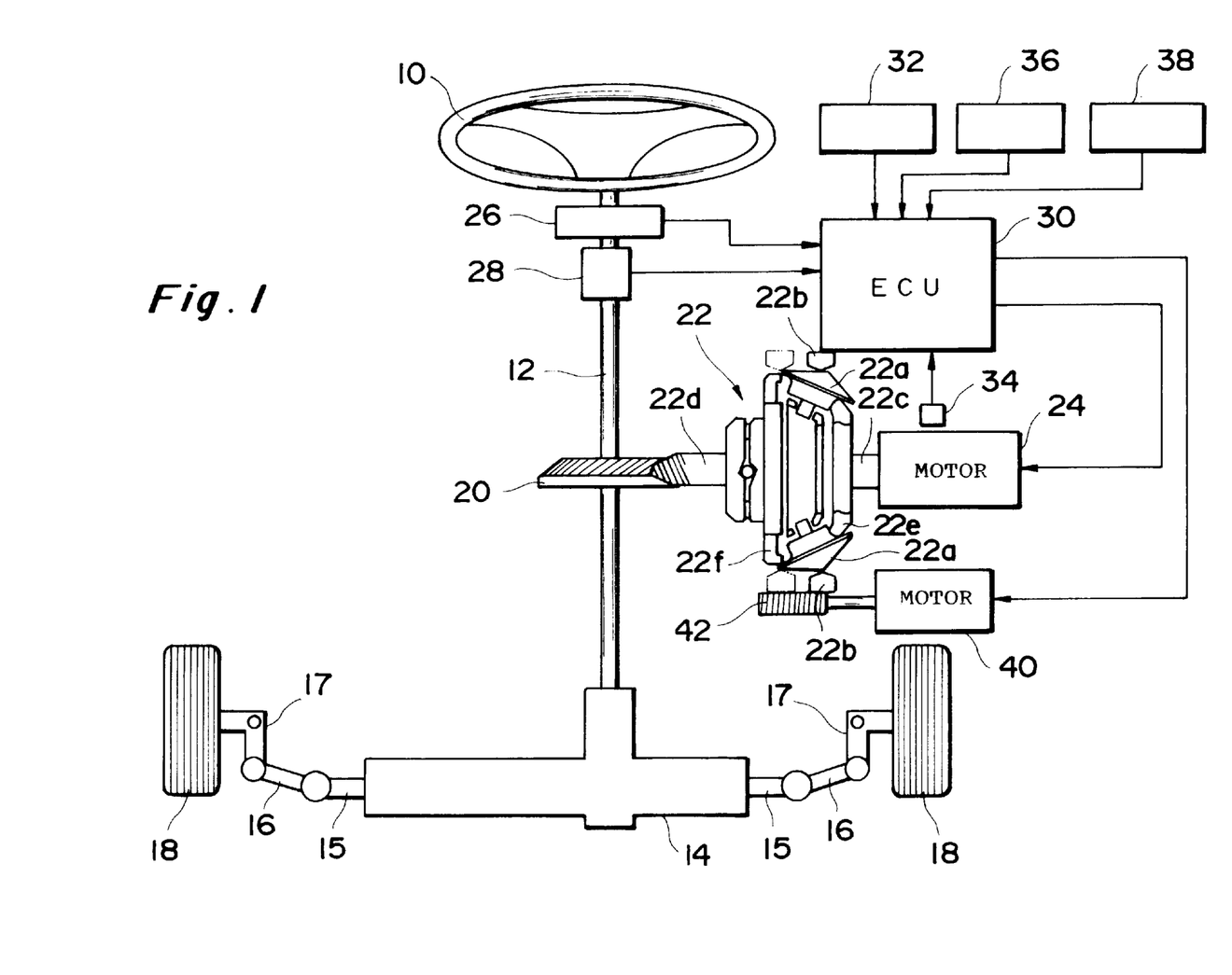
FIG. 1 is a structural drawing of the electric power steering apparatus according to the first embodiment of the present invention.

FIG. 1 is a diagram to show the structure of the electric power steering apparatus according to the first embodiment. In the drawing numeral 10 denotes a steering wheel, and this steering wheel 10 is connected to the top end of steering shaft 12. A pinion (not illustrated) is provided at the bottom end of steering shaft 12 and this pinion is in mesh with rack bar 15 in steering gear box 14. Further, one end of tie rod 16 is connected to each of the both ends of rack bar 15 and a tire 18 is connected through knuckle arm 17 to the other end of each tie rod 16. These elements compose a steering system for turning the tires 18 in accordance with manipulation of the steering wheel 10.

Bevel gear 20 is fixed in the intermediate portion of the steering shaft 12 stated above and power assist motor 24 is connected through non-stage transmission 22 to this bevel gear 20.

In the top portion of steering shaft 12 there are steering angle sensor 26 for detecting a steering angle of the steering wheel 10 and torque sensor 28 for detecting the steering torque of the steering wheel 10. The steering angle of steering wheel 10 detected by the steering angle sensor 26 and the steering torque detected by the torque sensor 28 are supplied to ECU (electronic control unit) 30 being a control means.

In addition to the above-stated steering angle and steering torque, the ECU 30 also receives a vehicle speed supplied from speed sensor 32 for detecting the driving speed of vehicle, information about motor lock supplied from motor lock detector 34 for detecting a lock state of the power assist motor 24, a signal indicating progress of vehicle behavior control, supplied from vehicle behavior control unit 36 for controlling the behavior of vehicle, and information about body slip amount, information about vehicle weight supplied from weight sensor 38 for detecting the weight of vehicle, and so on.

Based on the steering angle, steering torque, vehicle speed, motor lock information, and so on thus supplied, the ECU 30 outputs a control signal to transmission ratio changing motor 40 to change a transmission ratio of the non-stage transmission 22.

In this example, the non-stage transmission 22 is a frictional non-stage transmission using planetary cones 22a being bevel-shaped friction wheels, wherein as the transmission ratio changing motor 40 is driven, ring body 22b is moved through worm gear 42 to change a position of contact between the planetary cones 22a and the inside peripheral surface of ring body 22b, thereby changing the transmission ratio (which is equal to the number of rotations of input shaft 22c/the number of rotations of output shaft 22d).

This non-stage transmission 22 transmits rotation of input shaft 22c to the output shaft 22d through contact between input disc 22e and planetary cones 22a, contact between planetary cones 22a and ring body 22b, and contact between planetary cones 22a and cam disc 22f. When the ring body 22b is located at the extreme on the output shaft 22d side, the rotational speed of output shaft 22d becomes zero, so that the transmission ratio can be infinite. This non-stage transmission 22 is also characterized in that the transmission ratio can be changed even in a non-operating state.

Next described is the operation of the electric power steering apparatus according to the first embodiment, constructed in the above structure.

First described is a case in which the transmission ratio is changed in response to a change of steering torque on the steering wheel 10. The ECU 30 includes the relation between steering torque and transmission ratio shown in FIG. 2A in the form of a table and changes the transmission ratio according to the change of steering torque so as to maintain the relation indicated by the solid line in the same drawing.

When the steering wheel 10 is manipulated and the steering torque is detected by the torque sensor 28, the torque sensor 28 outputs a value of the steering torque detected to the ECU 30. In this case, the ECU 30 executes a determination about the magnitude of the value of steering torque. When it is determined that the value of steering torque was decreased from before, the ECU 30 outputs a control signal to the transmission ratio changing motor 40 to lower the transmission ratio of non-stage transmission 22, thereby increasing the number of rotations of the output shaft against the number of rotations of the input shaft. Namely, the transmission ratio is changed to another transmission ratio adapted to the value of steering torque detected (i.e., a transmission ratio indicated by the solid line in the graph of FIG. 2A).

This changing operation of transmission ratio is carried out by driving the transmission ratio changing motor 40 to move the ring body 22b to the right of FIG. 1, thereby changing the position of contact of the inside peripheral surface of ring body 22b with the planetary cones 22a.

By linearly decreasing the transmission ratio according to the value of steering torque detected as described above, the inertia force caused by the power assist motor 24 can be decreased, whereby the steering feeling of steering wheel 10 can be improved.

In this case the ECU 30 also increases a value of electric current supplied to the power assist motor 24 in accordance with the decrease in the transmission ratio of non-stage transmission 22. Namely, since the decrease of transmission ratio also decreases the assist by the power assist motor 24, the value of electric current supplied to the power assist motor 24 is increased so as to increase the torque of the motor. Accordingly, the inertial feeling due to the power assist motor 24 can be removed while maintaining the steering assist performance of the steering wheel 10.

Figure 2A:
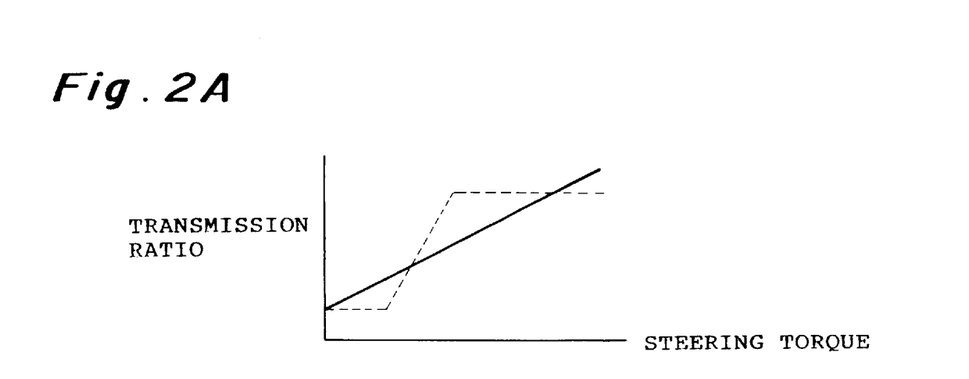
FIGS. 2A–2C are drawings to show states of change of transmission ratio of a non-stage transmission in the electric power steering apparatus according to the first embodiment of the present invention.

On the other hand, when the value of steering torque detected by the torque sensor 28 changes to increase, the transmission ratio will be increased as shown by the solid line of FIG. 2A. This prevents the steering assist by the power assist motor 24 from becoming insufficient. Since the driver becomes not so sensitive to the inertia due to the power assist motor 24 with increase in the steering torque, the increase of transmission ratio will not degrade the steering feeling.

In the above example the transmission ratios of non-stage transmission 22 are linearly changed in response to the values of steering torque detected as indicated by the solid line in the graph of FIG. 2A, but, in place thereof, the transmission ratios may be changed according to those indicated by the dashed line of the same drawing. Specifically, in order to prevent, the power assist motor 24 from acting as a large inertial object when the steering torque is extremely small, the transmission ratio is kept small in the extremely small region of steering torque; the transmission ratio is changed to increase after the steering torque exceeds a certain value. This can improve the steering feeling in the small steering torque range.

Next described is a case in which the transmission ratio is changed in response to a change of steering angle θ of the steering wheel 10. The ECU 30 includes the relation between steering angle and transmission ratio shown in FIG. 2B in the form of a table and changes the transmission ratio according to the change of steering angle so as to maintain the relation indicated by the solid line of the same drawing.

When the steering wheel 10 is manipulated and the steering angle sensor 26 detects a steering angle, the steering angle sensor 26 outputs a value of the steering angle detected to the ECU 30. In this case the ECU 30 executes a determination about the magnitude of the steering angle. When it is determined that the steering angle was decreased from before, the ECU 30 outputs a control signal to the transmission ratio changing motor 40 to decrease the transmission ratio of non-stage transmission 22, thereby increasing the number of rotations of the output shaft against the number of rotations of the input shaft. Namely, the transmission ratio is changed to another transmission ratio according to the value of the steering angle detected (i.e., a transmission ratio indicated by the solid line in the graph of FIG. 2B).

By decreasing the transmission ratio in accordance to the value of steering angle detected, the inertia force caused by the power assist motor 24 can be decreased, whereby the steering feeling of the steering wheel 10 can be improved.

In this case the ECU 30 also increases the value of electric current supplied to the power assist motor 24 in accordance with the decrease of transmission ratio of the non-stage transmission 22. Namely, since the decrease of transmission ratio also decreases the assist by the power assist motor 24, the motor torque is increased by increasing the value of electric current supplied to the power assist motor 24. For example, steering angle-assist torque characteristics are preliminarily set and feedback control to achieve matching with the set characteristics is carried out to increase the value of electric current supplied to the power assist motor 24, whereby the inertial feeling can be removed while maintaining the steering assist performance.

Figure 2B:
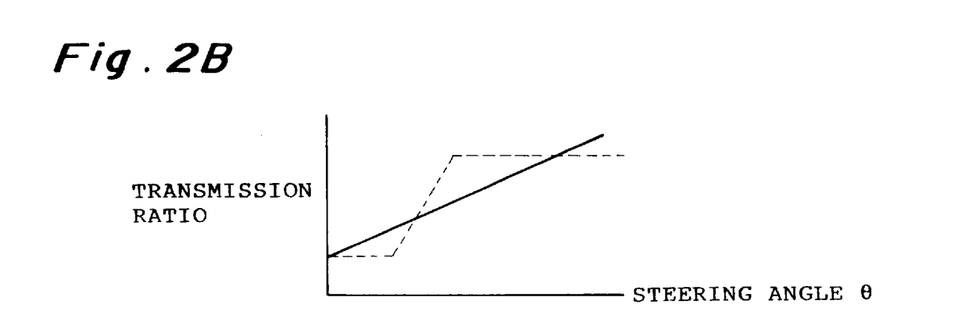
Figure 2C:
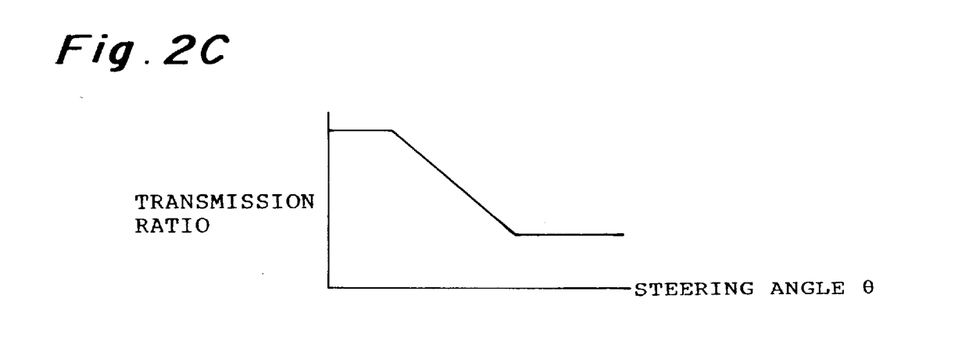

It can also be contemplated that the transmission ratio is changed to one indicated by the dashed line in the graph of FIG. 2B, in response to the value of steering angle detected. When the steering angles are extremely small (or in the neutral range of steering angle), the driver is likely to sense the power assist motor 24 as a large inertial object. Therefore, the transmission ratio is kept small in the extremely small region of steering angle and the transmission ratio is changed to increase after the steering angle exceeds a certain value, whereby the steering feeling can be improved in the small region of steering angle.

When the power assist motor 24 is an extremely compact and high-output motor, no problem will arise as to the inertial feeling by this power assist motor 24. Therefore, the transmission ratio of non-stage transmission 22 may be changed based on the relation between transmission ratio and steering angle shown in the graph of FIG. 2C. Specifically, when the steering angles are extremely small (or in the neutral range of steering angle), the transmission ratio is kept large to decrease the number of rotations of the output shaft against the number of rotations of the input shaft; after the steering angle exceeds a certain value, the transmission ratio is changed to decrease, thereby increasing the number of rotations of the output shaft against the number of rotations of the input shaft. This can prevent fluctuation upon straight-ahead driving, so as to improve driving stability, because large torque is needed to manipulate the steering wheel 10 in the neutral region of steering angle.

Next described is a case in which the transmission ratio is changed in response to a change of steering angular velocity $d\theta/dt$ of the steering wheel 10. In this case the ECU 30 includes the relation between steering angular velocity $d\theta/dt$ and transmission ratio shown in FIG. 3A in the form of a table and changes the transmission ratio according to the change of steering angular velocity $d\theta/dt$ so as to maintain the relation shown in the same drawing.

Figure 3A:
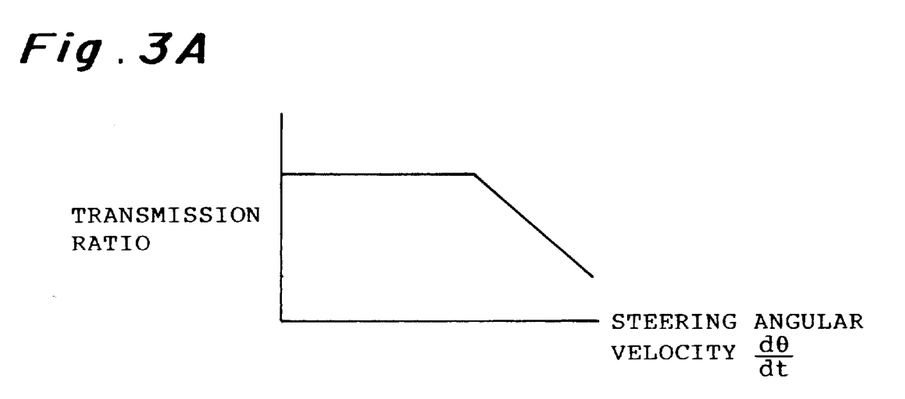
FIGS. 3A–3C are drawings to show states of change of transmission ratio of the non-stage transmission in the electric power steering apparatus according to the first embodiment of the present invention.

When the steering wheel 10 is manipulated and the steering angle sensor 26 detects the steering angle, the steering angle sensor 26 outputs a value of steering angle detected to the ECU 30. In this case the ECU 30 calculates the steering angular velocity based on a temporal change of steering angle.

The ECU 30 executes a determination about the magnitude of this steering angular velocity. When it is determined that the steering angular velocity is greater than a predetermined value, the ECU 30 outputs a control signal to the transmission ratio changing motor 40 to decrease the transmission ratio of non-stage transmission 22 in accordance with the steering angular velocity. Namely, the ECU 30 outputs the control signal to the transmission ratio changing motor 40 to change the transmission ratio according to the graph of FIG. 3A.

For example, when a tire 18 collides with the curb, the steering wheel 10 is made to rotate at high speed, while the power assist motor 24 is also made to rotate at high speed, thus having large kinetic energy. On such an occasion, the ECU 30 determines that the steering angular velocity is high and executes the control to decrease the transmission ratio. Therefore, even if the rack bar 15 moves up to the maximum steering angle to hit the rack end so as to stop the power assist motor 24 in a moment, the inertia force of power assist motor 24 transmitted to the steering shaft 12 can be decreased, whereby the gear portion of bevel gear 20 or the like can be prevented from being broken.

Next described is a case in which the transmission ratio is changed in response to a change of steering angular acceleration $d^2\theta/dt^2$ of the steering wheel 10. In this case the ECU 30 includes the relation between steering angular acceleration $d^2\theta/dt^2$ and transmission ratio shown in FIG. 3B in the form of a table and changes the transmission ratio in accordance with the change of steering angular acceleration $d^2\theta/dt^2$ so as to maintain the relation shown in the same drawing.

Figure 3B:
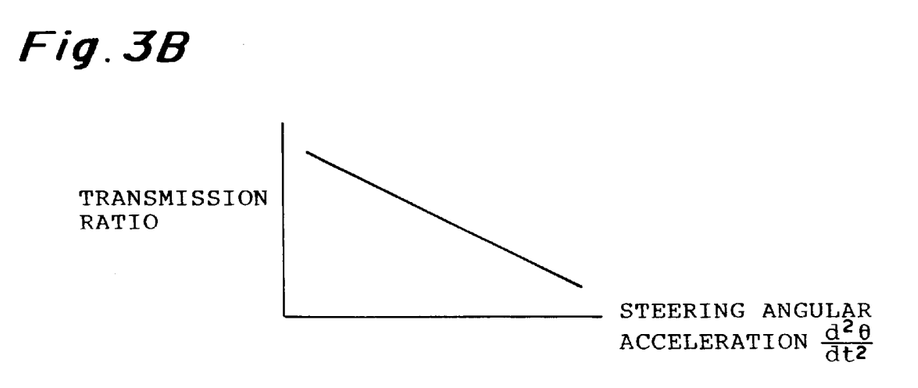

When the steering wheel 10 is manipulated and the steering angle sensor 26 detects the steering angle, the steering angle sensor 26 outputs a value of steering angle detected to the ECU 30. In this case the ECU 30 calculates the steering angular acceleration based on the temporal change of steering angle.

Then the ECU 30 executes a determination as to the magnitude of this steering angular acceleration. When it is determined that the steering angular acceleration is changing to increase, the ECU 30 outputs a control signal to the transmission ratio changing motor 40 to decrease the transmission ratio of non-stage transmission 22, thereby increasing the ratio of the number of rotations of the output shaft to the number of rotations of the input shaft. Namely, the ECU 30 outputs the control signal to the transmission ratio changing motor 40 to change the transmission ratio according to the graph of FIG. 3B.

Accordingly, when the value of steering angular acceleration is large, that is, when the steering wheel 10 is manipulated quickly, the transmission ratio is decreased, so as to decrease the inertia force exerted on the steering wheel 10 by the power assist motor 24, whereby the steering feeling of steering wheel 10 can be improved.

Next described is a case in which the transmission ratio is changed in response to a change of vehicle speed V. In this case the ECU 30 includes the relation between vehicle speed V and transmission ratio shown in FIG. 3C in the form of a table and changes the transmission ratio in accordance with the change of vehicle speed V so as to maintain the relation shown in the same drawing.

The speed sensor 32 detects the driving speed of vehicle and outputs a value of driving speed detected to the ECU 30. In this case the ECU 30 executes a determination as to the magnitude of vehicle speed. When it is determined that the vehicle speed is increasing, the ECU 30 outputs a control signal to the transmission ratio changing motor 40 to decrease the transmission ratio of non-stage transmission 22. Namely, the ECU 30 outputs the control signal to the transmission ratio changing motor 40 to change the transmission ratio based on the relation indicated by the solid line in the graph of FIG. 3C. When the transmission ratio is decreased in a state of constant assist force of the power assist motor 24, the assist force transmitted to the steering shaft 12 is decreased and strong force becomes necessary for the manipulation of steering wheel 10.

Figure 3C:
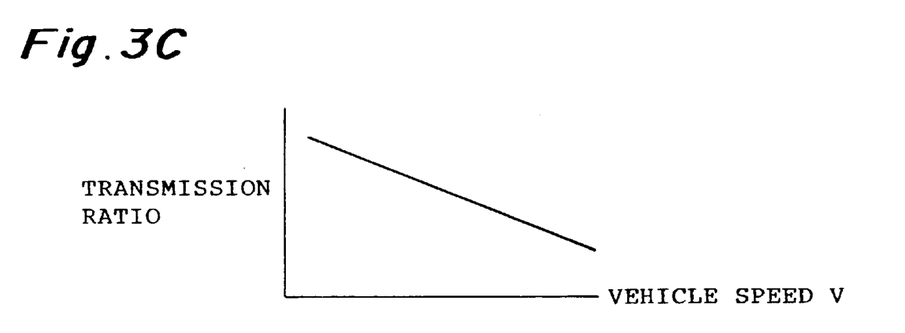

Accordingly, decreasing the transmission ratio with increase in the vehicle speed detected can enhance the driving stability of vehicle.

Next described is a case in which the transmission ratio of non-stage transmission 22 is changed when directions of the steering angular velocity and steering torque of the steering wheel 10 are opposite to each other. When the steering wheel 10 is manipulated, the steering angle sensor 26 detects the steering angle and the torque sensor 28 detects the steering torque. Then the steering angle sensor 26 and torque sensor 28 output the steering angle and steering torque to the ECU 30. In this case the ECU 30 calculates the steering angular velocity based on the temporal change of steering angle and executes a determination about the directions of the steering angular velocity and steering torque.

When it is determined that the directions of steering angular velocity and steering torque are opposite to each other, the ECU 30 outputs a control signal to the transmission ratio changing motor 40 to decrease the transmission ratio of non-stage transmission 22. This increases the number of rotations of the output shaft against the number of rotations of the input shaft.

For example, on the occasion of transition from cornering to straight-ahead driving, when the steering wheel 10 turned deep is returned to the neutral position, the directions of steering angular velocity and steering torque become opposite to each other. When the ECU 30 determines that the directions of steering angular velocity and steering torque are opposite to each other, for example, upon such return of steering wheel 10 or the like, the ECU 30 decreases the transmission ratio of non-stage transmission 22, so as to decrease the inertia force exerted on the steering wheel 10 by the power assist motor 24, whereby the steering feeling of steering wheel 10 can be improved.

Next described is a case in which the transmission ratio of non-stage transmission 22 is changed upon switching of turning direction of steering wheel 10. When the steering wheel 10 is manipulated, the steering angle sensor 26 detects the steering angle and outputs the steering angle to the ECU 30. In this case the ECU 30 executes a determination about inversion of steering angle. When the inversion of steering angle occurs, the ECU 30 outputs a control signal to the transmission ratio changing motor 40 to decrease the transmission ratio of non-stage transmission 22. The steering angle sensor 26 used herein has to be a steering angle sensor capable of detecting an absolute steering angle.

By decreasing the transmission ratio of non-stage transmission 22 upon switching of turning direction of the steering wheel 10 as described above, the inertia force exerted on the steering wheel 10 by the power assist motor 24 can be decreased, whereby the steering feeling of steering wheel 10 can be improved.

Next described is a case in which the transmission ratio of non-stage transmission 22 is changed upon vehicle behavior control. The "vehicle behavior control" stated herein means to control driving or braking of vehicle so as to avoid spin, drift-out, or the like of vehicle. When the behavior control of vehicle is under way by the vehicle behavior control unit 36, the vehicle behavior control unit 36 outputs a signal indicating that the vehicle behavior control unit 36 is in action, to the ECU 30.

During the vehicle behavior control the ECU 30 outputs a control signal to the transmission ratio changing motor 40 to increase the transmission ratio of non-stage transmission 22, thereby decreasing the ratio of the number of rotations of the output shaft to the number of rotations of the input shaft. By increasing the transmission ratio of non-stage transmission 22 in this way, the inertia force exerted on the steering wheel 10 by the power assist motor 24 increases, so that the driver cannot readily manipulate the steering wheel 10 against the control by the vehicle behavior control unit 36.

In the case of vehicles not equipped with the vehicle behavior control unit 36, a slip angle of vehicle is detected and the transmission ratio of non-stage transmission 22 is decreased when this slip angle is large, i.e., in a drift state of vehicle. The decrease of transmission ratio decreases the inertia force exerted on the steering wheel 10 by the power assist motor 24, so that the driver can quickly manipulate the steering wheel 10.

Next described is a case in which the transmission ratio of non-stage transmission 22 is changed depending upon the weight of vehicle. Specifically, the weight of vehicle is detected by the weight sensor 38 and information about the vehicle weight is outputted to the ECU 30. Accordingly, the ECU 30 executes a determination as to the vehicle weight and increases the transmission ratio of non-stage transmission 22 when it is determined that the vehicle weight is heavy. The increase of transmission ratio increases the inertia force exerted on the steering wheel 10 by the power assist motor 24, so that the driving stability of vehicle can be enhanced.

Next described is a case in which the transmission ratio is changed upon an operation inspection of the power assist motor 24. When the ignition key not illustrated is turned from OFF to ON, the operation inspection of power assist motor 24 is carried out. During this operation inspection of power assist motor 24 the ECU 30 outputs a control signal to the transmission ratio changing motor 40 to change the transmission ratio of non-stage transmission 22 to the infinity, i.e., to change the number of rotations of the output shaft to zero, irrespective of the number of rotations of the input shaft.

The ECU 30 outputs a control signal to the transmission ratio changing motor 40 to move the ring body 22b to the left extreme in FIG. 1, thereby changing the transmission ratio of non-stage transmission 22 to the infinity.

Therefore, the rotation of power assist motor 24 is not transmitted to the steering wheel 10, whereupon the operation inspection of power assist motor 24 can be carried out readily.

Next described is a case in which the transmission ratio of non-stage transmission 22 is changed to the infinity upon a key lock of steering wheel 10. Specifically, when the steering wheel 10 is locked, the ECU 30 outputs a control signal to the transmission ratio changing motor 40 to change the transmission ratio of non-stage transmission 22 to the infinity. Accordingly, the steering wheel 10 is fixed to become unmanipulable, thereby achieving the anti-theft effect of vehicle.

Figure 4:
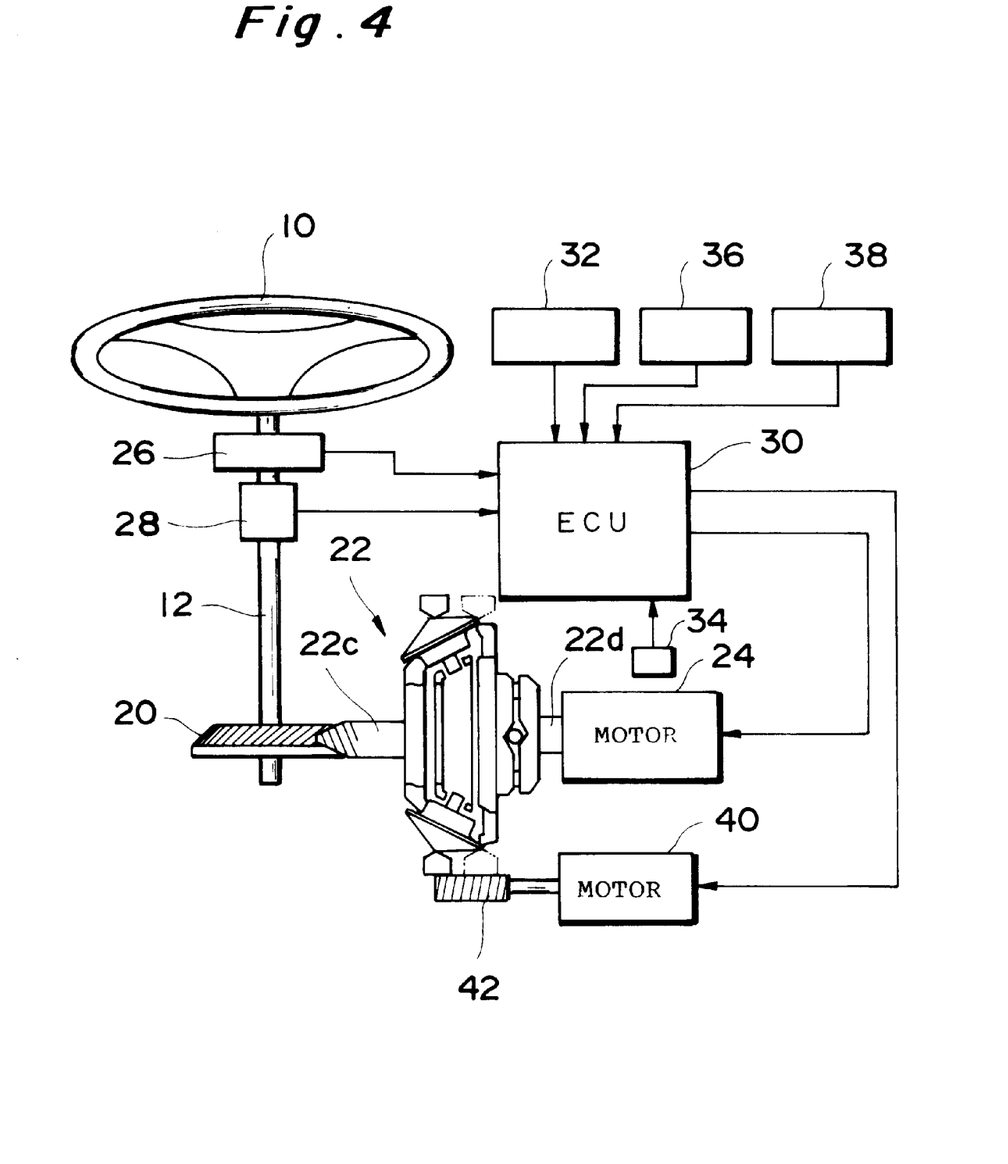
FIG. 4 is a structural drawing of the electric power steering apparatus according to the second embodiment of the present invention.

Next described referring to FIG. 4 is the electric power steering apparatus according to the second embodiment of the present invention. In the description of this electric power steering apparatus the same components as those of the electric power steering apparatus in the first embodiment will be denoted by the same symbols as those used in the description of the first embodiment and detailed description thereof will be omitted.

This electric power steering apparatus' according to the second embodiment is constructed substantially in the same structure as the electric power steering apparatus of the first embodiment except that the output shaft 22d of the non-stage transmission 22 in the electric power steering apparatus of the first embodiment is connected to the power assist motor 24 to be used as an input shaft and that the input shaft 22c thereof is in mesh with the bevel gear 20 to be used as an output shaft. A feature of this electric power steering apparatus is that the transmission ratio of non-stage transmission 22 can be changed to zero, i.e., that the output shaft becomes free to rotate when the number of rotations of the input shaft is zero. Another feature is that the transmission ratio can be changed even in the non-operating state.

Next described is the operation of the electric power steering apparatus of the second embodiment constructed in the above structure.

First described is a case in which the transmission ratio is changed to zero when the power assist motor is locked. When the power assist motor 24 is locked, the motor lock detector 34 outputs the motor lock information to the ECU 30. In this case, the ECU 30 outputs a control signal to the transmission ratio changing motor 40 to change the transmission ratio of non-stage transmission 22 to zero.

Namely, the ECU 30 outputs the control signal to the transmission ratio changing motor 40 to move the ring body 22b to the right extreme in FIG. 4, thereby changing the transmission ratio of non-stage transmission 22 to zero.

At this time the power assist motor 24 is disconnected from the steering wheel 10, so that the steering wheel 10 can be manipulated even in the lock state of the power assist motor 24.

This electric power steering apparatus of the second embodiment is also arranged to change the magnitude of inertia force exerted on the steering wheel 10 by the power assist motor 24, by changing the transmission ratio of non-stage transmission 22, based on the change of steering torque, change of steering angle, change of steering angular velocity, change of steering angular acceleration, change of vehicle speed, and so on, similarly to the electric power steering apparatus of the first embodiment, whereby the steering feeling of steering wheel 10 can be improved.

Figure 5:
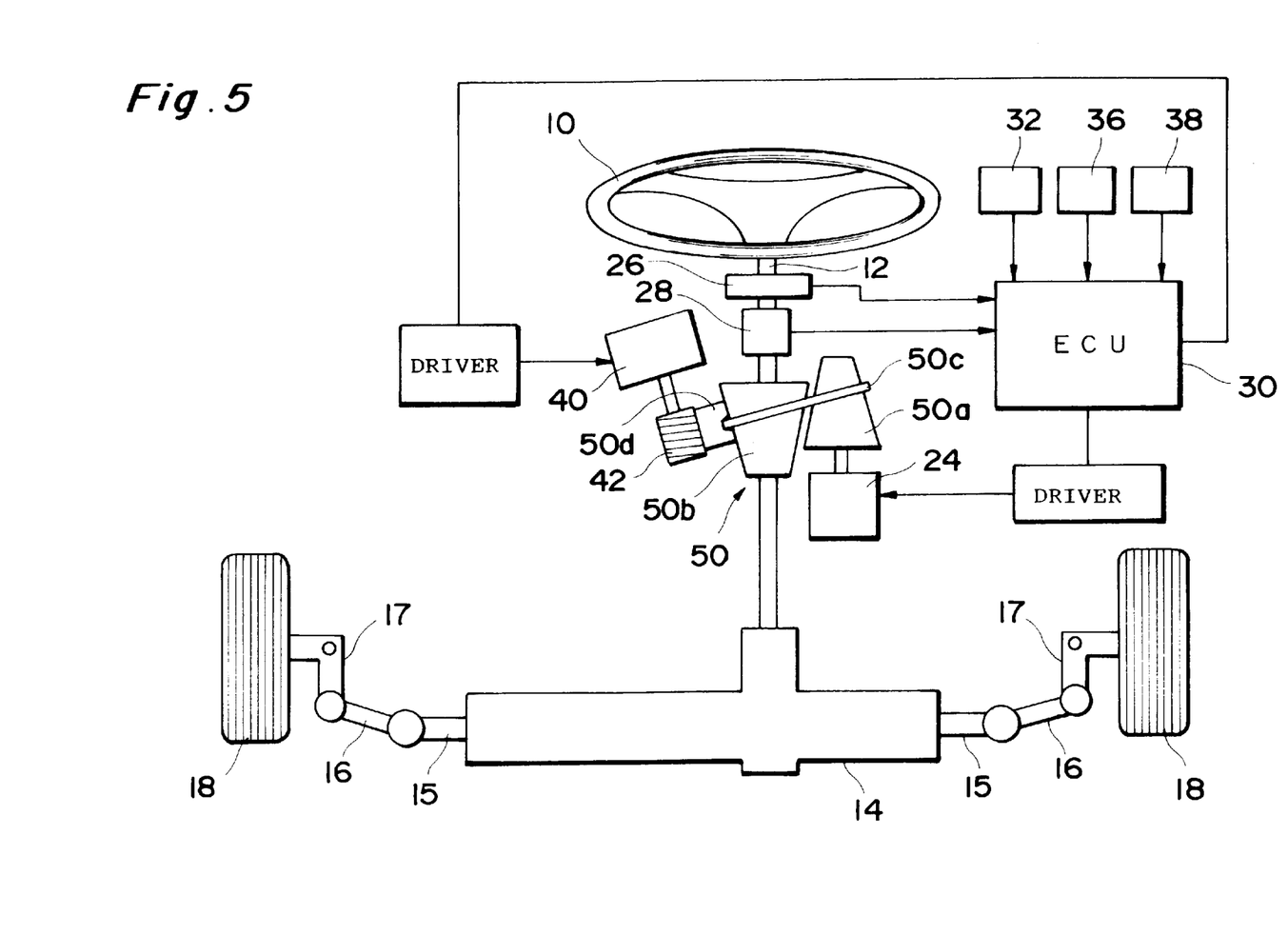
FIG. 5 is a structural drawing of the electric power steering apparatus according to the third embodiment of the present invention.

Next described referring to FIG. 5 is the electric power steering apparatus according to the third embodiment of this invention. In the description of this electric power steering apparatus the same components as those of the electric power steering apparatus of the first embodiment will be denoted by the same symbols as those used in the description of the first embodiment and detailed description thereof will be omitted.

The electric power steering apparatus of the third embodiment is constructed substantially in the same structure as the electric power steering apparatus of the first embodiment except that the non-stage transmission 22 of the electric power steering apparatus of the first embodiment is replaced by non-stage transmission 50.

In this example, the non-stage transmission 50 is a non-stage transmission of the ring cone RC type, which is constructed of input cone 50a connected to the power assist motor 24, output cone 50b fixed to the steering shaft 12, ring 50c for transmitting rotation from the input cone 50a to the output cone 50b, and ring slide gear 50d in mesh with the worm gear 42 connected to the transmission ratio changing motor 40.

In this electric power steering apparatus, the transmission ratio changing motor 40 is driven by a control signal from the ECU 30 to change the position of ring 50c so as to change effective diameters for transmission of the input cone 50a and output cone 50b, thereby changing the transmission ratio.

The electric power steering apparatus of the third embodiment is also arranged so that the magnitude of inertia force exerted on the steering wheel 10 by the power assist motor 24 can be changed by changing the transmission ratio of non-stage transmission 50, based on the change of steering torque, change of steering angle, change of steering angular velocity, change of steering angular acceleration, change of vehicle speed, and so on, similarly to the electric power steering apparatus of the first embodiment, whereby the steering feeling of steering wheel 10 can be improved.

Figure 6:
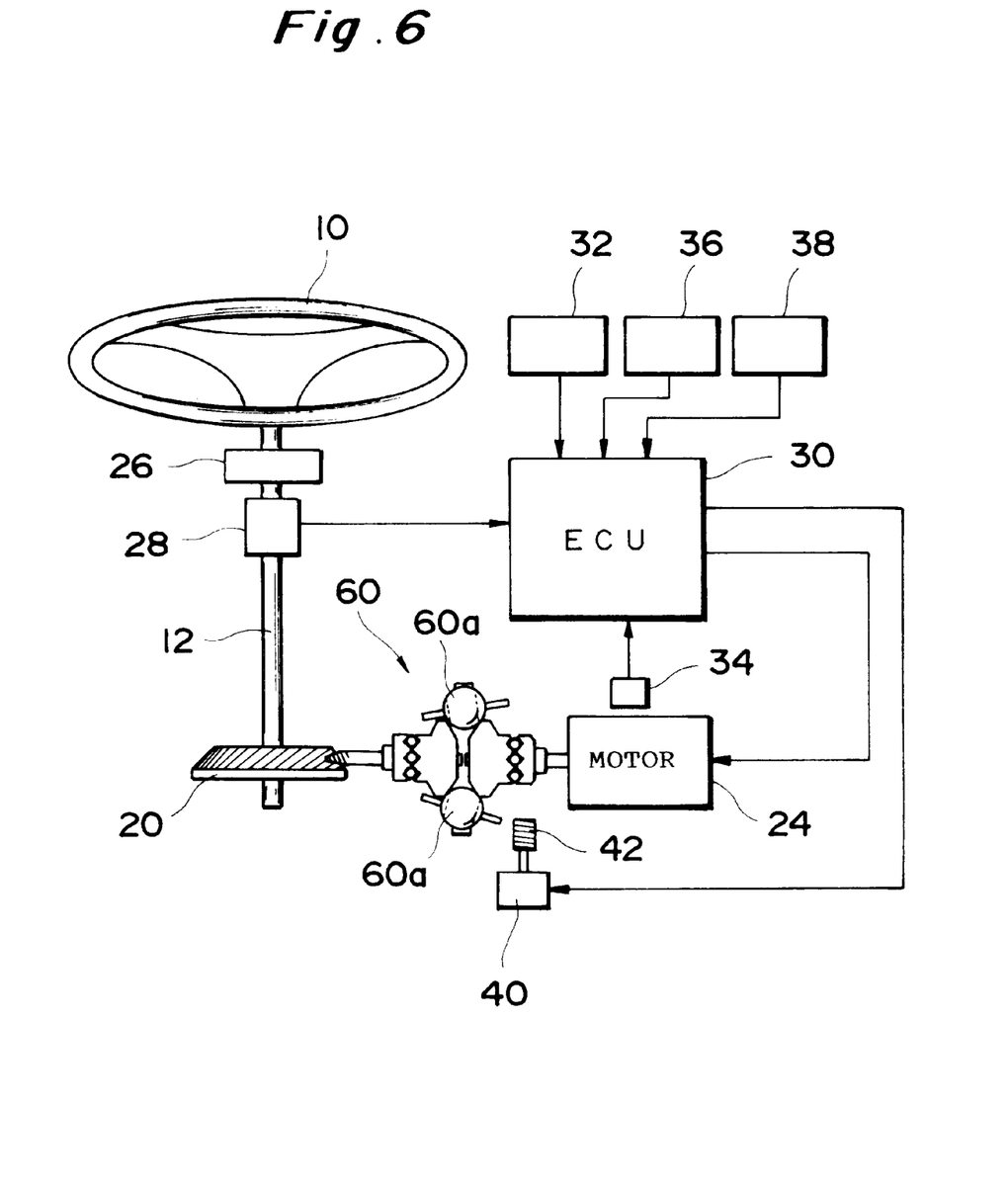
FIG. 6 is a structural drawing of the electric power steering apparatus according to the fourth embodiment of the present invention.

Next described referring to FIG. 6 is the electric power steering apparatus according to the fourth embodiment of this invention. In the description of the electric power steering apparatus of the fourth embodiment the same components as those of the power steering apparatus according to the first embodiment will be denoted by the same symbols as those used in the description of the first embodiment and detailed description thereof will be omitted.

The electric power steering apparatus of the forth embodiment is constructed substantially in the same structure as the electric power steering apparatus of the first embodiment except that the non-stage transmission 22 of the electric power steering apparatus according to the first embodiment is replaced by non-stage transmission 60.

In this example the non-stage transmission 60 is a non-stage transmission of the ball wheel type, which is constructed to have balls 60a for transmitting rotation from the input shaft to the output shaft.

In this electric power steering apparatus, the transmission ratio changing motor 40 is driven by a control signal from the ECU 30 to incline the axes of the balls 60a, thereby changing the transmission ratio of non-stage transmission 60.

The electric power steering apparatus of the fourth embodiment is also arranged so that the magnitude of inertia force exerted on the steering wheel 10 by the power assist motor 24 can be changed by changing the transmission ratio of non-stage transmission 60, based on the change of steering torque, change of steering angle, change of steering angular velocity, change of steering angular acceleration, change of vehicle speed, and so on, similarly to the electric power steering apparatus of the first embodiment, whereby the steering feeling of steering wheel 10 can be improved.

Figure 7:
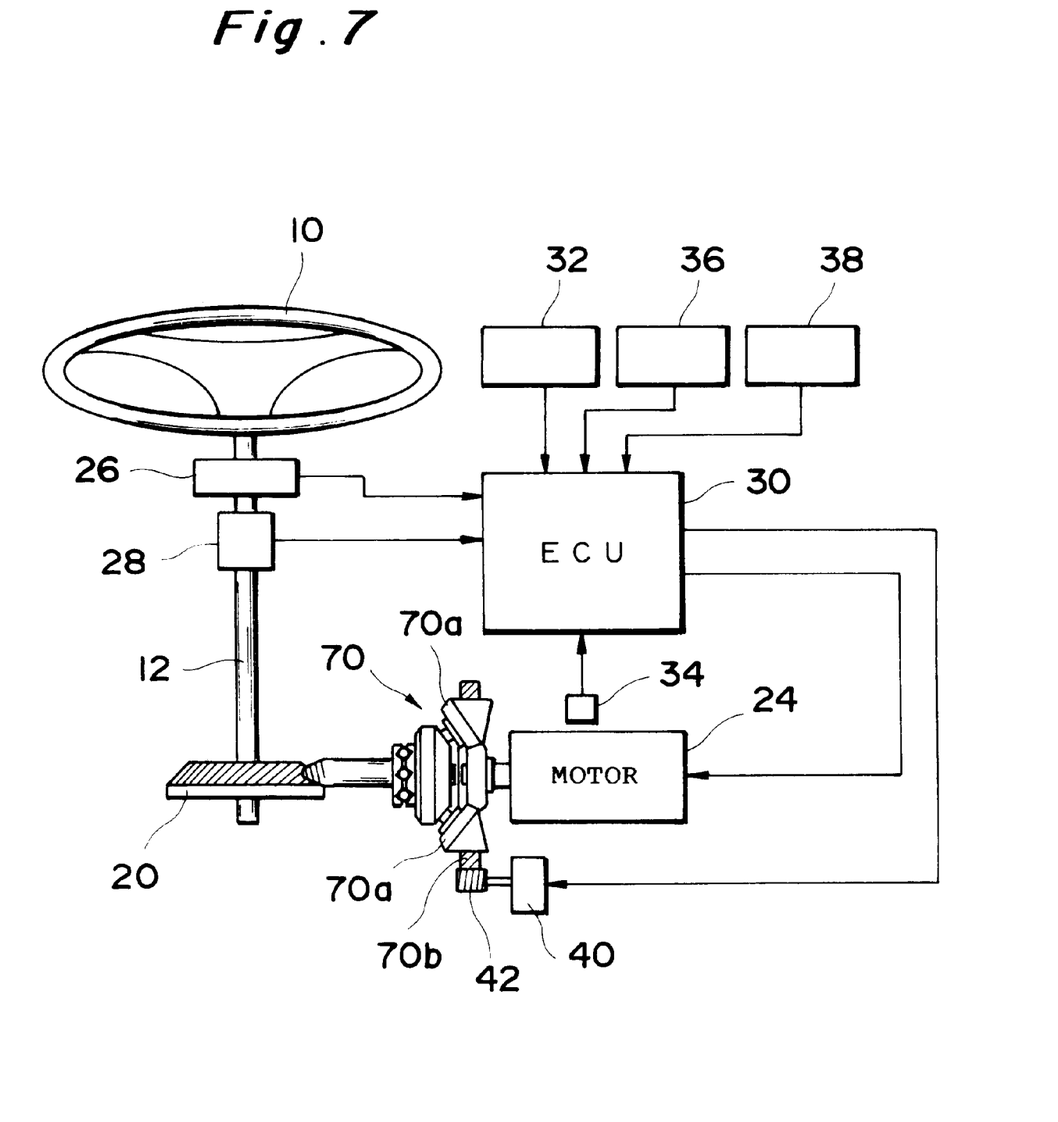
FIG. 7 is a structural drawing of the electric power steering apparatus according to the fifth embodiment of the present invention.

Next described referring to FIG. 7 is the electric power steering apparatus according to the fifth embodiment of this invention. In the description of the electric power steering apparatus of the fifth embodiment the same components as those of the power steering apparatus according to the first embodiment will be denoted by the same symbols as those used in the description of the first embodiment and detailed description thereof will be omitted.

The electric power steering apparatus of the fifth embodiment is constructed substantially in the same structure as the electric power steering apparatus of the first embodiment except that the non-stage transmission 22 of the electric power steering apparatus according to the first embodiment is replaced by non-stage transmission 70.

In this example, the non-stage transmission 70 is a non-stage transmission of the ring cone SC type, which is constructed to have planetary cones 70a, ring 70b the inside peripheral surface of which is in contact with the planetary cones 70a, and so on.

In this electric power steering apparatus, the transmission ratio changing motor 40 is driven by a control signal from the ECU 30 to change the position of ring 70b so as to change effective diameters for transmission of the planetary cones 70a, thereby changing the transmission ratio.

The electric power steering apparatus of the fifth embodiment is also arranged so that the magnitude of inertia force exerted on the steering wheel 10 by the power assist motor 24 can be changed by changing the transmission ratio of non-stage transmission 70, based on the change of steering torque, change of steering angle, change of steering angular velocity, change of steering angular acceleration, change of vehicle speed, and so on, similarly to the electric power steering apparatus of the first embodiment, whereby the steering feeling of steering wheel 10 can be improved.

Figure 8:
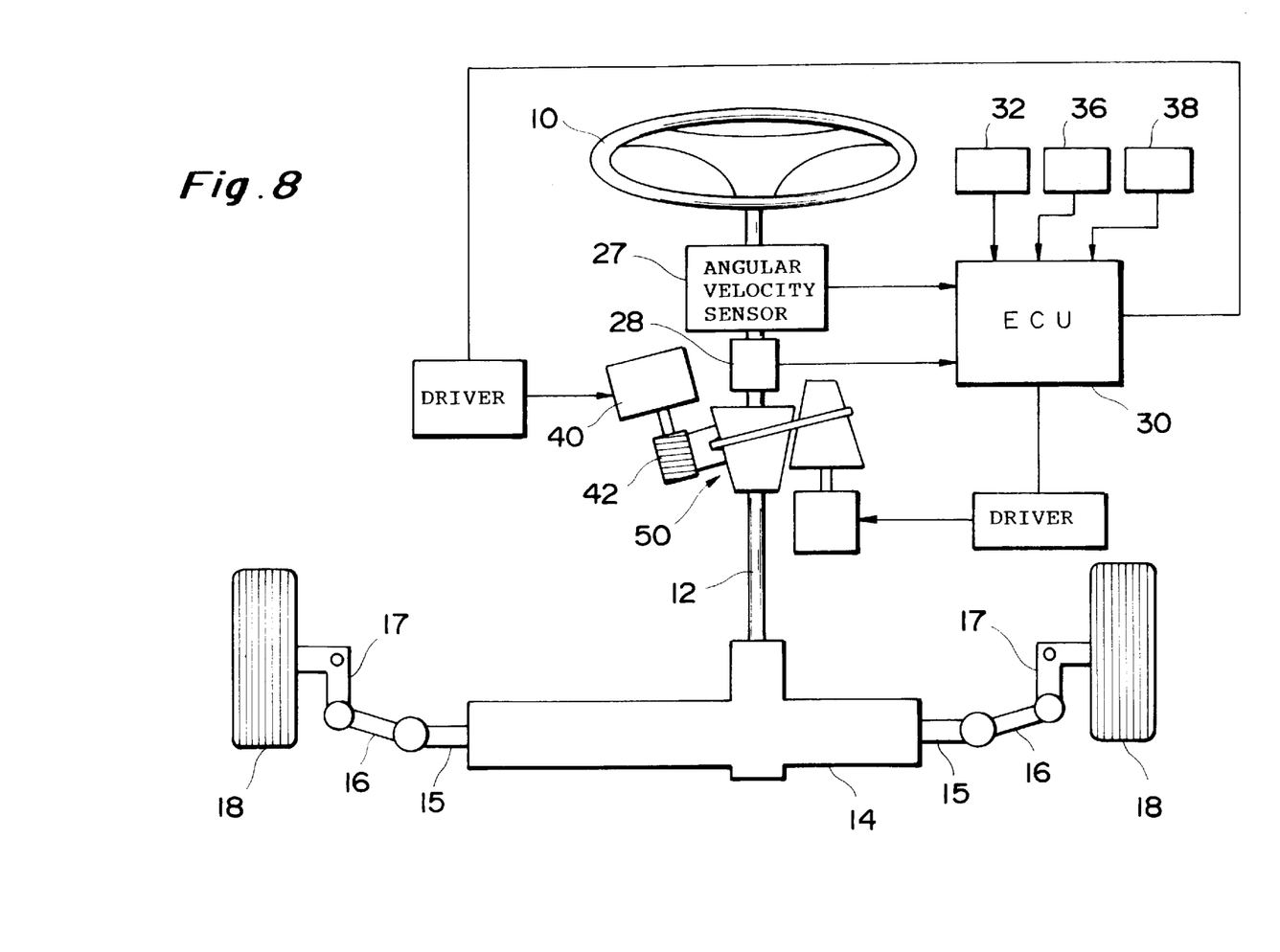
FIG. 8 is a structural drawing of the electric power steering apparatus according to the sixth embodiment of the present invention.

Next described referring to FIG. 8 is the electric power steering apparatus according to the sixth embodiment of this invention. In the description of the electric power steering apparatus of the sixth embodiment the same components as those of the power steering apparatus according to the first embodiment will be denoted by the same symbols as those used in the description of the first embodiment and detailed description thereof will be omitted.

The electric power steering apparatus of the sixth embodiment is constructed substantially in the same structure as the electric power steering apparatus of the third embodiment except that the steering angle sensor 26 of the electric power steering apparatus according to the third embodiment is replaced by angular velocity sensor 27.

The electric power steering apparatus of the sixth embodiment is also arranged so that the magnitude of inertia force exerted on the steering wheel 10 by the power assist motor 24 can be changed by changing the transmission ratio of non-stage transmission 50, based on the change of steering torque, change of steering angle, change of steering angular velocity, change of steering angular acceleration, change of vehicle speed, and so on, similarly to the electric power steering apparatus of the first embodiment, whereby the steering feeling of steering wheel 10 can be improved.

Figure 9:
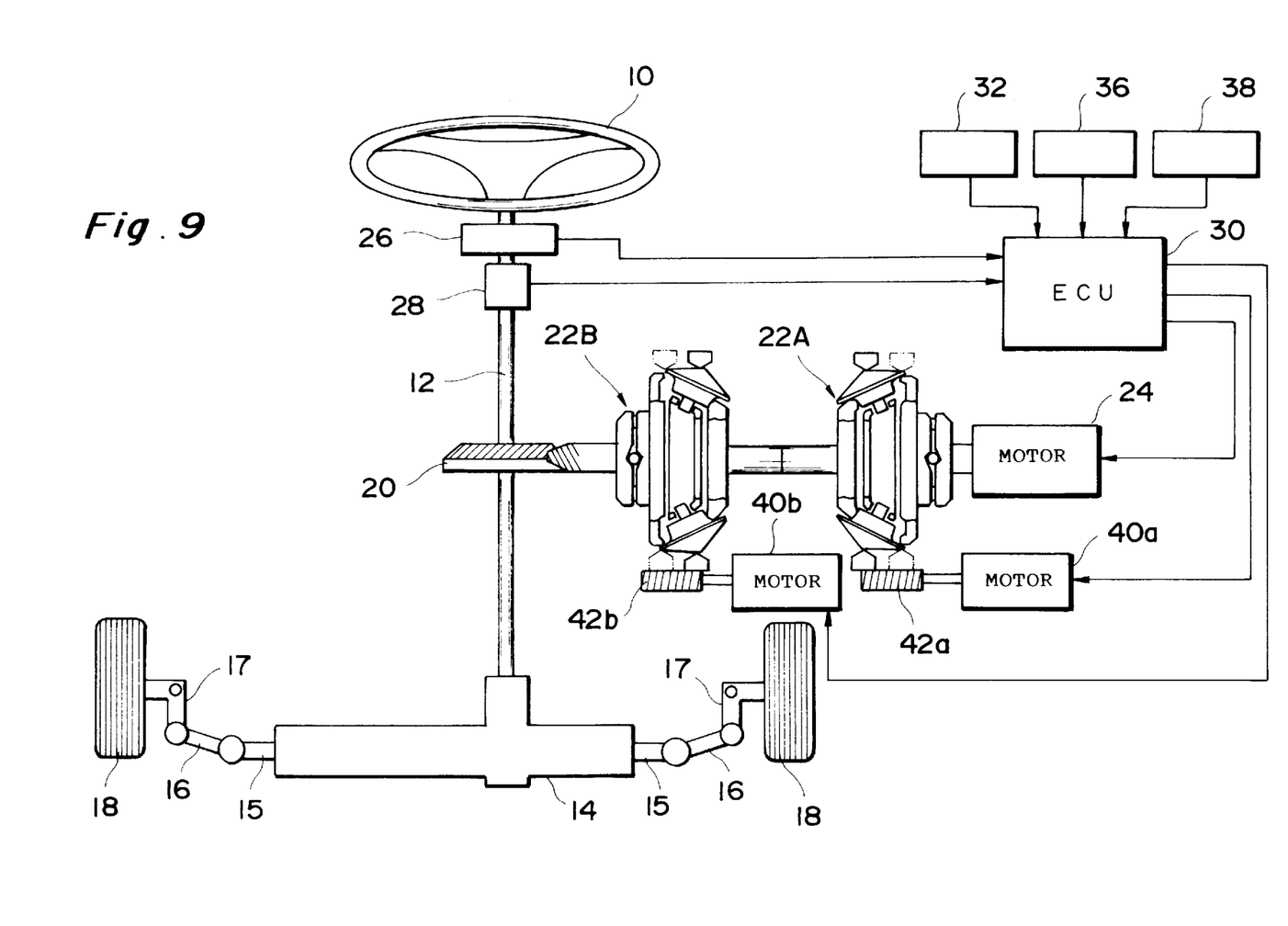
FIG. 9 is a structural drawing of the electric power steering apparatus according to the seventh embodiment of the present invention.

Next described referring to FIG. 9 is the electric power steering apparatus according to the seventh embodiment of this invention. In the description of the electric power steering apparatus of the seventh embodiment the same components as those of the power steering apparatus according to the first embodiment will be denoted by the same symbols as those used in the description of the first embodiment and detailed description thereof will be omitted.

The electric power steering apparatus of the seventh embodiment is constructed by replacing the non-stage transmission 22 of the electric power steering apparatus according to the first embodiment by non-stage transmissions 22A, 22B which are the same as the non-stage transmission 22. Specifically, the non-stage transmission 22A is connected to the power assist motor 24 and the non-stage transmission 22B is connected in the reverse orientation to the non-stage transmission 22A. The assist force is transmitted through the non-stage transmissions 22A, 22B to the steering shaft 12. The non-stage transmissions 22A, 22B of this electric power steering apparatus are characterized in that they can vary the transmission ratio from zero to the infinity. The apparatus is constructed substantially in the same structure as the electric power steering apparatus of the first embodiment except for the above point.

The electric power steering apparatus of the seventh embodiment is also arranged so that the magnitude of inertia force exerted on the steering wheel 10 by the power assist motor 24 can be changed by changing the transmission ratio of non-stage transmissions 22A, 22B, based on the change of steering torque, change of steering angle, change of steering angular velocity, change of steering angular acceleration, change of vehicle speed, and so on, similarly to the electric power steering apparatus of the first embodiment, whereby the steering feeling of steering wheel 10 can be improved.

Each of the embodiments described above may also be so arranged as to increase the transmission ratio of non-stage transmission, based on a judgment that the vehicle is running on a highway, according to information from a navigation system not illustrated. Since during the run on the highway the assist force by the power assist motor is small, the inertia force by the power assist motor is increased by the above arrangement, so that the stability of straight-ahead driving can be enhanced during the run on the highway.

Each of the above embodiments may also be so arranged as to change the transmission ratio of non-stage transmission according to weather conditions. Specifically, rainy weather is detected by detecting raindrops by a raindrop sensor not illustrated, by operation of wipers, or the like and the transmission ratio of non-stage transmission is increased based thereon, thereby increasing the inertia force due to the power assist motor, whereby the stability can be enhanced upon straight-ahead driving.

Each of the above embodiments may also be so arranged as to change the transmission ratio of non-stage transmission, based on whether the daytime or the nighttime. Specifically, driving during the nighttime is detected based on the turning on of head lights or the like and the transmission ratio of non-stage transmission is increased so as to increase the inertia due to the power assist motor, whereby the stability of straight-ahead driving can also be enhanced during the nighttime.

In each of the above embodiments, occurrence of flutter can be suppressed by detecting the occurrence of flutter of steering wheel 10 and changing the transmission ratio of non-stage transmission upon occurrence of flutter. Specifically, the occurrence of flutter can be suppressed, because the change of transmission ratio of non-stage transmission causes the system to deviate from the resonance frequency of vehicle.

Each of the above embodiments may also be so arranged as to increase the transmission ratio of non-stage transmission during shift operation of shift lever. The increase of transmission ratio of non-stage transmission can increase the inertia force due to the power assist motor, so that the inertia force restrains the steering wheel from being manipulated during the shift lever operation, thus improving the stability of straight-ahead driving.

According to this invention, when the steering wheel is manipulated, the motor output is transmitted to the steering system to assist the steering effort on the steering wheel; in this case, the motor output is transmitted through the transmission to the steering system, thereby controlling the inertia force of motor which could affect the manipulation of the steering wheel.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An electric power steering apparatus comprising:
   a steering system for turning a tire in accordance with manipulation of a steering wheel;
   a power assist motor for supplying a force for assisting the turning by said steering system;
   a transmission with variable transmission ratios interposed between said motor and said steering system; and
   control means for controlling the transmission ratios of said transmission and for controlling an output of said motor in accordance with the turning of the tire by said steering system.

2. An electric power steering apparatus according to claim 1, wherein said control means controls the transmission ratios of said transmission in accordance with a steering condition of said steering system.

3. An electric power steering apparatus according to claim 2, wherein said steering condition is a status of steering torque.

4. An electric power steering apparatus according to claim 2, wherein said steering condition is a status of steering angle.

5. An electric power steering apparatus according to claim 2, wherein said steering condition is a status of steering velocity.

6. An electric power steering apparatus according to claim 2, wherein said steering condition is a status of steering acceleration.

7. An electric power steering apparatus according to claim 1, wherein said control means corrects output torque of said motor in accordance with a change amount of transmission ratio of said transmission.

8. An electric power steering apparatus according to claim 1, further comprising lock state detecting means for detecting a lock state of said motor, wherein said control means changes a transmission ratio of said transmission to zero when the lock state of said motor is detected by said lock state detecting means.

9. An electric power steering apparatus according to claim 1, wherein said control means changes a transmission ratio of said transmission to the infinity upon an inspection of operation of said motor.

10. An electric power steering apparatus according to claim 1, wherein when a steering direction by said steering system is different from a direction of steering torque, said control means makes a transmission ratio of said transmission smaller than that when the steering direction by said steering system is coincident with the direction of steering torque.

11. An electric power steering apparatus according to claim 1, wherein when a steering direction by said steering system is inverted, said control means makes a transmission ratio of said transmission smaller than that before the steering direction by said steering system is inverted.

12. An electric power steering apparatus according to claim 1, wherein when said steering system turns said tire, said control means makes a transmission ratio of said transmission smaller in the vicinity of a maximum steering angle of said tire than those in a range except for the vicinity of the maximum steering angle of said tire.

13. An electric power steering apparatus according to claim 1, wherein said control means changes the transmission ratios of said transmission in accordance with a vehicle condition.

14. An electric power steering apparatus according to claim 1, wherein said transmission comprises:
   discs provided on the side of said motor and on the side of said steering system, respectively;
   a friction wheel frictionally contacting said both discs; and
   a ring body an inside peripheral surface of which frictionally contacts an outside peripheral surface of said frictional wheel,
   wherein a transmission ratio is changed by changing a position of the contact between the outside peripheral surface of said frictional wheel and the inside peripheral surface of said ring body.

15. An electric power steering apparatus according to claim 8, wherein said transmission comprises:
   discs provided on the side of said motor and on the side of said steering system, respectively;
   a friction wheel frictionally contacting said both discs; and
   a ring body an inside peripheral surface of which frictionally contacts an outside peripheral surface of said frictional wheel,
   wherein a transmission ratio is changed by changing a position of the contact between the outside peripheral surface of said frictional wheel and the inside peripheral surface of said ring body.

16. An electric power steering apparatus according to claim 9, wherein said transmission comprises:
   discs provided on the side of said motor and on the side of said steering system, respectively;
   a friction wheel frictionally contacting said both discs; and
   a ring body an inside peripheral surface of which frictionally contacts an outside peripheral surface of said frictional wheel,
   wherein a transmission ratio is changed by changing a position of the contact between the outside peripheral surface of said frictional wheel and the inside peripheral surface of said ring body.

17. An electric power steering apparatus according to claim 1, wherein said transmission comprises a non-stage transmission.

* * * * *

UNITED STATES PATENT AND TRADEMARK OFFICE
CERTIFICATE OF CORRECTION

PATENT NO. : 6,041,887
DATED : March 28, 2000
INVENTOR(S) : Takahiro Kojo & Junji Kawamuro

It is certified that error appears in the above-identified patent and that said Letters Patent is hereby corrected as shown below:

Foreign Application Priority Data:

Japan 9-003065 January 10, 1997

Signed and Sealed this

Third Day of April, 2001

*Attest:*

NICHOLAS P. GODICI

*Attesting Officer*  *Acting Director of the United States Patent and Trademark Office*